G. EHRSAM.
Hemp Machine.
No. 39,219.
Patented July 14, 1863.
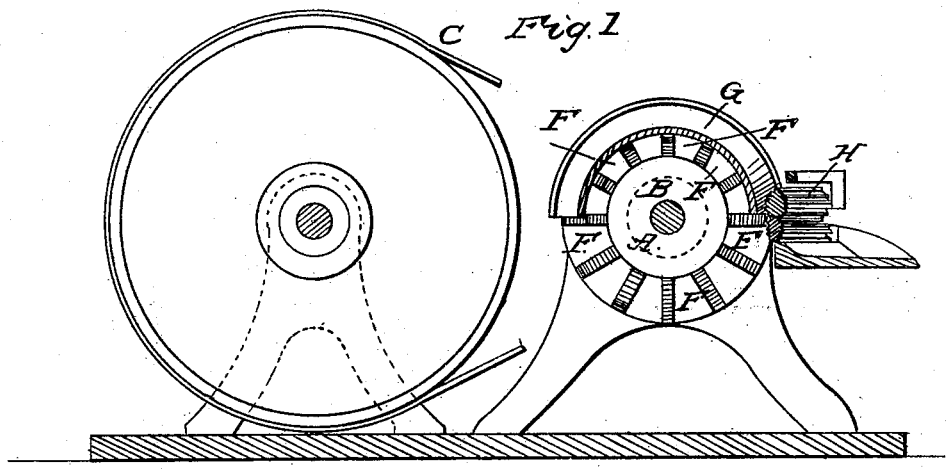
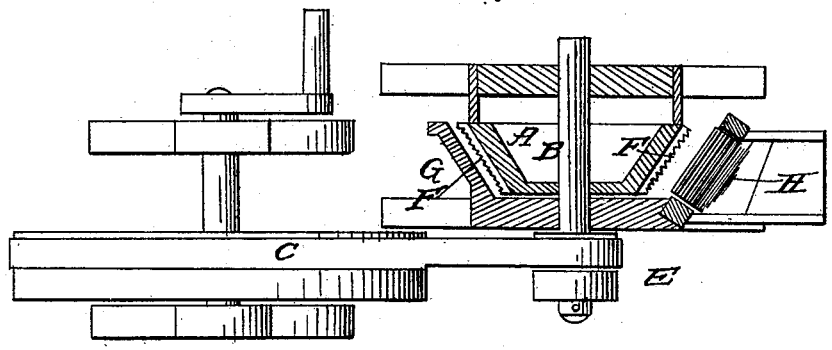
Witnesses
Wm Hauff
Geo W Reed
Inventor
G. C. Ehrsam

UNITED STATES PATENT OFFICE.

GEORGE EHRSAM, OF NEW YORK, N. Y.

IMPROVEMENT IN HEMP-MACHINES.

Specification forming part of Letters Patent No. 39,219, dated July 14, 1863.

*To all whom it may concern:*

Be it known that I, GEORGE EHRSAM, of the city, county, and State of New York, have invented a new and Improved Hemp-Machine; and I do hereby declare that the following is a full, clear, and exact description of the same, reference being had to the accompanying drawings, forming a part of this specification, in which—

Figure 1 represents a longitudinal vertical section of my invention. Fig. 2 is a horizontal section of the same.

Similar letters of reference in both views indicate corresponding parts.

This invention relates to an improvement in that class of hemp-machines which are principally used for the purpose of dressing the leaves of *Agave Americana* and other plants of a similar nature.

The invention consists in the employment or use of a cone-drum carrying a series of combs and working within or under a cone-cap in such a manner that by the gradually increasing speed of the surface of the cone from the small to the large end of the same the leaves are caused to roll over the entire surface of the several combs, and the fiber is completely cleaned and discharged from the machine without much difficulty.

The invention consists, further, in the employment of combs with teeth of gradually-increasing fineness from the small toward the large end of the cone-drum, for the purpose of producing the best possible action of said combs on the fiber.

The invention consists, finally, in giving to the feed-rollers an oblique position in relation to the main shaft of the drum in such a manner that by the action of said rollers the leaves are forced from one end of the drum toward the other, and the fibers are prevented remaining in the same teeth of the combs from beginning to end of the combing operation.

To enable others skilled in the art to make and use my invention, I will proceed to describe it.

A represents a cone-drum, which is secured to the shaft B, and to which a rotary motion is imparted by a belt, C, running from the driving-pulley over a fast and loose pulley, E, on the shaft B, or which may receive its motion from any source of power in any desirable manner. The cone-drum A is provided with a series of combs, F, which are secured to its conical surface in such a position that if projected they would meet at the apex of the cone, and said drum works under a cone-cap, G, which fits close to the points of the combs on the drum, so as to keep the leaves in contact with them, and which is open at the large end to leave room for the discharge of the clean fibers.

The leaves are fed to the cone-drum by means of feed-rollers H, which are placed in an oblique position toward the shaft B, or parallel with the surface of the drum, and the teeth of the combs F are of gradually-increasing fineness, being coarsest at the small and finest at the large end of the drum. The leaves are delivered by the feed-rollers to the small end of the cone-drum, and by the oblique position of the feed-rollers, and also by the difference in the surface speed of the small and large end of the drum, they are carried or rolled gradually over the whole surface of the cone, thus exposing the fibers to the subsequent action of all the teeth of each comb. With a cylindrical drum and feed-rollers parallel to the main shaft of said drum, the leaves are carried round the surface in parallel lines, keeping the fibers in the same teeth throughout the whole operation, and a perfect cleaning is not effected. With my cone-drum and oblique feed-rollers this difficulty is obviated by causing the leaves to roll over the whole surface of the drum, and exposing the fibers to the action of different or, properly speaking, of all the teeth of each comb.

The operation of cleaning the fibers is further facilitated by the gradually-increasing fineness of the teeth, so that such impurities which are not scraped off by the coarse teeth on the small end of the drum will certainly not escape the fine teeth on the large end. Furthermore, by the oblique position of the feed-rollers and by the conical surface of the drum, the fibers are readily discharged at the open or large end of the cap, and the operation of my machine is thus rendered perfectly sure, and much superior in every respect to those machines now in use for the same purpose.

What I claim as new, and desire to secure by Letters Patent, is—

1. The employment or use of conical drum A, carrying a series of combs, F, and working within or under a cone-cap, G, in the manner and for the purpose substantially as herein shown and described.

2. Discharging the clean fibers over the large end of the cone-drum A through the open side of the cap G, in the manner and for the purpose substantially as specified.

3. Making the teeth of the combs F of gradually-increasing fineness from one toward the other end of the drum, as and for the purpose set forth.

4. Giving to the feed-rollers an oblique position in relation to the main shaft of the drum, substantially as and for the purpose specified.

G. EHRSAM.

Witnesses:
W. HAUFF,
GEO. W. REED.